Aug. 9, 1960    O. H. SCHUCK    2,948,149
ANGLE OF ATTACK INDICATING DEVICE
Filed Nov. 27, 1953    2 Sheets-Sheet 1
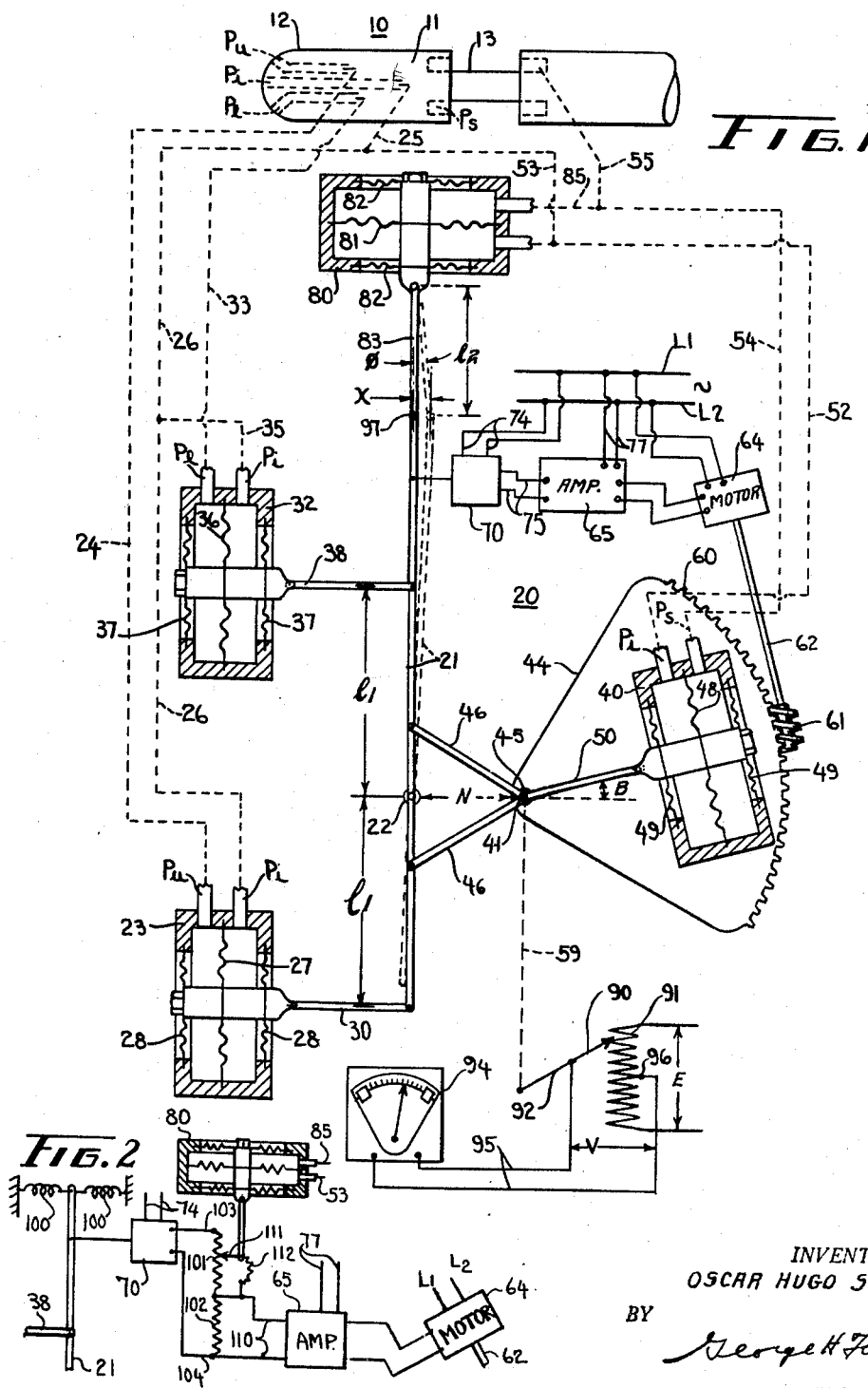
INVENTOR.
OSCAR HUGO SCHUCK
BY
George H Fisher
ATTORNEY

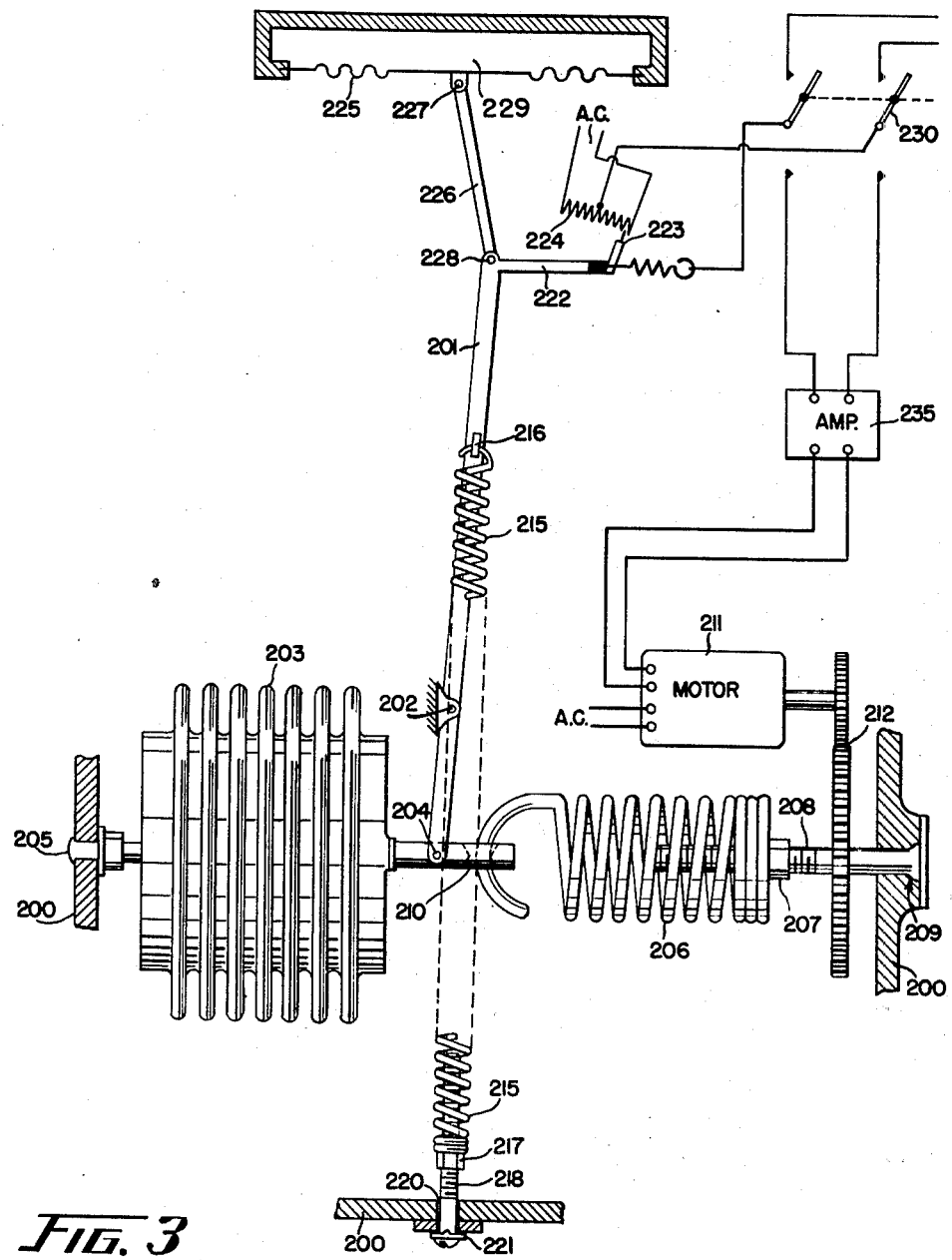

United States Patent Office 2,948,149
Patented Aug. 9, 1960

2,948,149
ANGLE OF ATTACK INDICATING DEVICE

Oscar Hugo Schuck, Minneapolis, Minn., assignor to Minneapolis-Honeywell Regulator Company, Minneapolis, Minn., a corporation of Delaware Filed Nov. 27, 1953, Ser. No. 394,653

14 Claims. (Cl. 73—180)

This invention is a continuation in part of my earlier application, Serial No. 74,425 for a "Rotary Force Balance Angle of Attack Sensing Device," filed February 3, 1949, and now abandoned.

This invention relates to a condition responsive means for varying the sensitivity and providing stabilized operation of a pressure responsive device for the desired range of operation. It is therefore an object of this invention to provide means for varying the sensitivity of a first condition responsive means to compensate for the changing of operating conditions sensed by second condition responsive means.

One application of this invention relates to an angle of attack indicating and controlling apparatus and more particularly to an angle of attack indicator of the pressure orifice type which utilizes a force balance system for measuring angle of attack from the pressure sensed at the orifices. It is therefore a further object of this invention to provide an angle of attack indicator of the orifice type which uses an improved force balance method of determining angle of attack.

Another object of this invention is to provide an angle of attack indicator of the force balance type in which the various forces act in tension rather than in compression to provide for increased stability of the indicator.

It is further an object of this invention to provide an angle of attack indicator which is highly accurate and calibrated for all air speeds.

It is also an object of this invention to provide, in an angle of attack indicating device, a restoring force which insures sensitivity at both low and high air speeds.

It is another object of this invention to provide an angle of attack indicator which insures uniform sensitivity at all air speeds by making the speed of response proportional to air speed.

Another object of this invention is to provide, in an angle of attack indicator, means responsive to air speed which compensates for the effect of air speed on the means sensing angle of attack pressures.

A further object of this invention is to provide an angle of attack indicator which is simple in construction and sensitive and accurate in operation.

It is another object of this invention to provide in an altitude controller means responsive to altitude pressure which compensates for the effect of relative altitude on means for indicating change of altitude in feet.

These and other objects of this invention will readily become apparent as the following specification is read in the light of the accompanying drawing, wherein:

Figure 1 is a sketch of an embodiment of my invention, as related to a rotary force balance angle of attack sensing device;

Figure 2 is a sketch of a modification of the embodiment of Figure 1; and

Figure 3 is a sketch of an embodiment of my invention as related to a constant altitude controller.

My improved angle of attack indicator, as shown in Figure 1, utilizes a sensing head 10 of the orifice type which combines the conventional Pitot-static tube with angle of attack sensing orifices in what is commonly known as a Prandtl tube. As is well known in the art, the measure of angle of attack depends upon the orifice pressures as follows:

$$\alpha = \frac{P_l - P_u}{P_i - P_s} K$$

wherein $P_l$ and $P_u$ are pressures at the symmetrically disposed lower and upper orifices, $P_i$ is impact pressure, $P_s$ is static pressure, $K$ is a constant and $\alpha$ is value of angle of attack. Sensing head 10 has a cylindrical body 11 with a hemispherical end 12 in which are positioned the impact pressure orifice $P_i$ of the conventional Pitot-static tube and the angle of attack sensing orifices $P_u$ and $P_l$ above and below the impact pressure orifice. The cylindrical body or shaft 11 has an opening 13 therein remote from the hemispherical or forward end 12. The static pressure orifices $P_s$ are located at opening 13 of cylindrical body or shaft 11. For simplicity the orifices in the sensing head and the pressures obtained at such orifices are designated by the same letters, namely $P_l$, $P_u$, $P_i$, and $P_s$.

The pressures from the sensing head 10 are applied to a rotary force balance system, indicated at 20, which includes a lever member 21 pivoted at a fixed point 22, the lever being subjected to varying moments of force to determine angle of attack from the sensed pressures. The lever member 21 is subjected to moments of force through operating arms of means responsive to the differences of sensed pressures of said sensing head or pressure responsive devices which in turn are actuated by the sensed pressures as will be noted below. Thus a pressure responsive device 23 actuated by the difference between the upper angle of attack pressure $P_u$ and the impact pressure $P_i$ applies a force or moment to one end of the pivoted lever 21. The upper angle of attack orifice $P_u$ is connected by a tube 24 to pressure responsive device 23 and the impact pressure orifice $P_i$ is connected to pressure responsive device 23 by a tube 25 which connects with a tube 26 leading to the pressure responsive device 23. As disclosed in the drawing the pressure responsive device 23 is a chamber divided by a diaphragm 27, and having a pair of sealing diaphragms 28. The two sides of the diaphragm 27 are subjected to the pressures $P_u$ and $P_i$ as indicated above. An actuating rod 30 is connected to the diaphragms 27 and 28 at their centers to transmit a force proportional to the difference in pressures on either side of the diaphragm 27. While rod 30 is recited as a single element for simplicity, it actually includes two sections pivotally connected together so that any transverse movement thereof will not adversely effect the operation of the pressure responsive device 23. This actuating rod 30 is attached by means of a pivoted connection to one extremity of pivoted lever 21. Similarly, another pressure responsive device 32 is subjected to the pressure $P_l$ at the lower angle of attack orifice through a connection 33, which pressure is opposed by the impact pressure $P_i$ obtained from the impact orifice $P_i$ through tubes 25, 26 and 35. As previously described for device 23, the pressure responsive device 32 contains a diaphragm 36 and sealing diaphragms 37. The two sides of the diaphragm 36 are subjected to the pressures $P_l$ and $P_i$ respectively. An actuating rod 38, which includes two pivotally connected sections, is attached to these diaphragms at their centers and transmits a force proportional to the difference in pressure on the two sides of the diaphragm 36. The actuating rod 38 of pressure responsive device 32 is also pivotally attached to lever 21, at a point located at the same distance from the pivot 22 as is the connection with the actuating rod 30 of pressure responsive device 23, this location being on the opposite side of the pivot 22 from the connection to actuating rod 30. The distance between the connections of the actuating rods 30 and 38 and pivot 22 has been designated as $l_1$ for purposes which will be later noted.

Pressure responsive devices 23 and 32 apply variable moments of force depending upon the angle of attack pressures $P_l$ and $P_u$ through fixed moment arms $l_1$ about the pivot point 22. These moments of force are in opposition to one another and are in general of different magnitude, so that an unbalanced condition is created in the force balance system 20. To compensate for this unbalanced condition, or to balance the same, a third pressure responsive device 40 is used to direct its force through a variable moment arm. The pressure responsive device 40 responds to the difference between the impact and static pressures and its force is applied at the apex 41 of a triangular structure composed of sides or arms 46 attached to lever arm 21 in such a manner that this apex or pivot point 41 lies along a line normal to lever 21 and passing through the pivot point 22. The distance between the pivot points 41 and 22 along the line normal to lever 21 has been designated as N for purposes which will be later noted. Pressure responsive device 40 is mounted on a sector-like plate 44, which plate is pivoted at a fixed pivot point 45, located directly under the normal position of pivot 41, that is, the position it has when force balance system 20 is balanced. The pressure responsive device 40 is similar to pressure responsive devices 23 and 32 in construction, having a diaphragm 48 and sealing diaphragms 49. The two sides of diaphragm 48 are subjected to pressures $P_i$ and $P_s$ respectively. Actuating rod 50 is similar to rods 30, 38 in that it actually includes two sections pivotally connected together, and is connected to the centers of the diaphragms so as to transmit a force proportional to the difference of pressures $P_i$ and $P_s$. It is connected to and pivoted on the apex of the triangular frame at 41, this being the only connection between the pressure responsive device 40 and the lever 21. The impact pressure $P_i$ is fed to the pressure responsive device 40 through a tube 52 which connects with a tube 53 leading to tube 25 and orifice $P_i$. The static pressure $P_s$ is fed to the pressure responsive device 40 through a tube 54 which connects with a tube 55 leading to the static orifice $P_s$.

Pressure responsive device 40, through its actuating rod 50, exerts a force in tension on lever 21 through the actuating rod 50. The magnitude of this force varies with the pressure difference between the impact pressure $P_i$ and the static pressure $P_s$ and the direction of application of this force varies with the rotation of the plate 44 about the pivot 45. Plate 44 has a circular or sector-like periphery which carries gear teeth 60 thereon. These gear teeth 60 mesh with a drive worm 61 which is driven through a shaft 62 actuated by a motor 64. The details of motor 64 are omitted in the drawing but it is to be understood that motor 64 can be any type of a reversible motor, preferably a two-phase electric motor, one phase of which is energized directly from a source $L_1$, $L_2$, the other phase being energized through an amplifier 65, which is controlled by displacement-sensitive pickup device 70. The details of amplifier 65 are also omitted but it is to be understood that any type of amplifying device capable of energizing the controlled phase winding of the motor for rotation in either direction may be used. Likewise, the details of the displacement pickup device are omitted since any form of displacement-sensitive pickup, such as inductive, capacitive or resistive, may be used. Pickup 70 herein is energized by conductors 74 and its electrical output is connected to the input of amplifier 65 through conductors 75. Motor 64, amplifier 65 and pickup device 70 are so chosen that displacement of lever 21 from its normal position, where all moments of forces applied to it are balanced, causes rotation of the motor in one direction or the other, depending upon the direction of the displacement of lever 21 from its normal position. When the forces are balanced, the motor does not rotate. When energized, motor 64 rotates and causes the screw 61 to rotate plate 44 about the pivot point 45 through the geared relationship between teeth 60 and the worm 61 thereby varying the direction of the application of the force from the pressure responsive device 40. The angular relationship between the line normal to the lever 21 and the direction of application of the force or pressure responsive device 40 is indicated as B in the drawings, this angular relationship being a function of the angle of attack sensed by the pressure head 10 when the forces applied to lever 21 are in balance.

Also attached to the extremity of lever 21 beyond the displacement sensitive pickup 70 is another pressure responsive device 80, a means responsive to airspeed which applies a restoring force to the force balance system. Pressure responsive device 80 is similar in construction to the pressure responsive devices 23, 32 and 40 in that it has a diaphragm 81, sealing diaphragms 82, and an actuating rod 83, which is attached at the centers of the diaphragms and transmits a force proportional to the difference in pressure at the two sides of the diaphragm 81. Rod 83, similar to rods 50, 38 and 30, actually includes two sections in pivotal connection so that displacement of the diaphragms connected to it takes place generally in one direction. The pressure responsive device 80 responds to the difference between impact pressure $P_i$ and static pressure $P_s$ in that the chamber to one side of diaphragm 81 is connected through tubes 53 and 25 to the impact pressure orifice $P_i$ and the other side is connected through tubes 85 and 55 to the static pressure orifices $P_s$. Actuating rod 83 is attached to lever 21 by a pivotal connection at 97. Since the impact pressure $P_i$ is always greater than the static pressure $P_s$ if the aircraft is moving, the force transmitted by rod 83 to lever 21 is one of tension. Its magnitude is proportional to the difference between impact and static pressures. Its effect on the system is proportional to the displacement of the lever 21 from its neutral or balanced condition. This can be seen in the drawing, in which the length of the actuating rod 83 between the pressure responsive device 80 and the connection to lever 21 is indicated as $l_2$ and the lateral displacement of the lever and the pivoted operating rod from the neutral position is indicated by the distance $x$. Under these conditions the relationship between these linear distances can be expressed as $x = l_2 \sin \phi$ where $\phi$ is the angular displacement of the arm 83 from its neutral position. The force exerted by connecting rod 83 is equal to $(P_i - P_s)$ and hence the force F along the distance $x$, which is the restorative force of the system, can be expressed as $F = (P_i - P_s) \sin \phi$. Since $\sin \phi$ can be expressed with sufficient exactitude as $$\sin \phi = \frac{x}{l_2}$$

it will be noted that $$F = \frac{(P_i - P_s)}{l_2} x$$

and as such the restoring force is proportional to the difference in the impact and static pressures and the displacement of lever 21 in any unbalanced condition. As will be pointed out in the following, use of such a restoring force allows maintaining the stability of the indicator independent of air speed.

Operatively connected to the pivot point 45 and plate 44 is a shaft 59 which actuates a signal producing device 90 or potentiometer in response to the variations in the position of plate 44 or the variation in the angle B. The signal-producing device 90 gives an electrical output signal proportional to the sine of the angle of rotation B of shaft 59. It may consist of a linear card potentiometer winding 91 with a wiper 92 which is insulated from and attached to the shaft 59 and contacts winding 91 along an arcuate path. In this case the potentiometer winding 91 is energized from a unidirectional voltage source E, and a signal output indicated at V is obtained between a center tap 96 on winding 91 and wiper 92 which is proportional to the angle of attack sensed by sensing device 10 when lever 21 is in balance. A meter 94, which in this disclosure is a D.C. voltmeter, is connected to measure the voltage V between center tap 96 and wiper 92 to give an indication of the angle of attack measured. Meter 94 has a centrally located zero indication and portions of the scale are marked as areas of impending stall conditions.

The embodiment of Figure 2 is substantially the same as that disclosed in Figure 1, with the exception of the location and operation of the pressure responsive device 80 in the system. Hence, only that portion of the rotary force balance system which is modified is shown. It is to be understood however, that the sensing head 10, the pressure responsive devices 23, 32 and 40 and their attachment to the main portion of lever member 21, and the indicating apparatus remains unchanged.

In place of the direct attachment of pressure responsive device 80 to lever 21 to provide the variable restoring force to the system in proportion to air speed, this embodiment provides for the restoring force by biasing means or mechanical springs 100 of fixed spring rates. Springs 100 are secured to an extremity of lever 21, and are anchored to any stationary portion of the device. Displacement sensitive pickup 70 is attached to lever 21 in the same manner as described in connection with Figure 1, pickup 70 being the same as that previously described and being energized in the same manner. The output of pickup device 70 is connected to resistors 101 and 102 in series by conductors 103, 104, resistor 102 being located across the input 110 of amplifier 65, and resistor 101 being connected to conductor 103 and located in series with the input of amplifier 65. Resistor 102 is fixed in value and resistor 101 is variable, having a wiper 111 which is connected to the input of amplifier 65 by a flexible conductor 112. Wiper 111 of resistor 101 is actuated by pressure-responsive device 80 in response to the air speed pressures $P_1-P_s$ in such a manner as to short out a variable portion of the resistance 101 in series with the amplifier input thereby varying the input signal or the effective gain. Amplifier 65 and motor 64 controlled thereby are the same as that described in connection with Figure 1. By varying the input or effective gain of amplifier 65 the rate of response of motor 64 is varied and hence the system is stabilized for the air speed condition prevailing.

The operation of these rotary force balance systems as angle of attack indicators is based on the relationship between the pressures sensed at the sensing head 10 as they relate to angle of attack. As is well known, the equation $$\frac{P_1-P_u}{P_i-P_s}=K_1\alpha$$

indicates this relationship. In the equation $K_1$ is a constant determined by the angular spacing between the angle of attack orifices from the impact pressure orifice and $\alpha$ is equal to the angle of attack sensed. This relationship is used as a moment balance equation, through the automatic balancing of the moments applied to lever 21. A resultant moment due to the pressure difference $P_1-P_u$ is balanced by a moment dependent on the pressure difference $P_1-P_s$ and the angle of its application. In order that the rods 30 and 38 may act in tension, the pressures $P_1$ and $P_u$ are each compared with the impact pressure $P_i$ as a reference. The moments due to the pressure responsive devices 23 and 32 as taken about the point 22 are $$l_1(P_i-P_u)-l_1(P_i-P_1)=l_1(P_1-P_u)$$

The moment balance equation for lever 21 can then be written as $$l_1(P_1-P_u)=(P_i-P_s)N \sin B$$

wherein $N \sin B$ is equal to the effective moment arm for the balancing force $(P_i-P_s)$ applied by the pressure responsive device 40 and $l_1$ is the moment arm for the forces $P_1$ and $P_u$. This can be written as $$\left(\frac{P_1-P_u}{P_i-P_s}\right)=\frac{N}{l_1}\sin B$$

Then with the output signal of the signal generator 90 expressed as $V=K_2E \sin B$, $K_2$ being a constant for the indicator, the equations can be solved to eliminate sin B and written as $$\frac{P_1-P_u}{P_i-P_s}=\frac{N}{l_1 K_2 E}V$$

Referring to formula for angle of attack above it will be noted that $$\frac{P_1-P_u}{P_i-P_s}=K_1\alpha$$

and hence $$K_1\alpha=\frac{NV}{l_1 K_2 E}$$

is obtained.

Further, this may be written as $$\alpha=\left(\frac{N}{K_1 K_2 l_1 E}\right)(V)$$

In this equation V is variable and this value controls the indicator 94 to give the indication which is calibrated to angle of attack. As indicated by the equations, the force balance system is balanced when the moment of force from the pressure responsive device 40 is equal to the difference between the moments of force from the pressure responsive devices 23 and 32. As the angle of attack varies, a condition of unbalance will occur in the force balance system 20 and lever 21 will move and control the energization of amplifier 65 through the displacement sensitive pickup 70 to control the direction of energization and hence the direction of rotation of motor 64. As motor 64 rotates, it drives the mounting plate 44 with the pressure responsive device 40 thereon and hence varies the direction of application of force of this pressure responsive device, thereby varying its moment arm to vary the balancing or counteracting moment of force applied to lever 21. Rotation of plate 44 continues until the moments applied to lever 21 are balanced, and then stops. The voltage output V which is controlled by this rotation then indicates angle of attack.

The restoring force applied by the pressure responsive device 80 is directly proportional to the difference between impact and static pressures and the displacement of the lever from its balanced condition but the effect of this restoring force does not appreciably vary the balance of the system. In Figure 1 it is provided to bias the lever toward a neutral position in such a way that a maximum speed of response of motor 64 can be obtained throughout the entire air speed range. The pressure responsive device 80 decreases the sensitivity of pickup 70 to a force producing displacement of lever 21 from neutral position as air speed increases.

The output of displacement sensitive pickup 70 is proportional to the displacement of lever 21 from its normal or balanced position; the torque and speed of motor 64 are consequently also proportional to the displacement of lever 21, as is the rate of change of the angle B. If the spring rates of the pressure responsive devices 23, 32, 40 and 80 are negligibly low, substantially all of the restoring force applied to lever 21 is contributed by the effect of the pressure difference $P_1-P_s$ acting through rod 83.

Suppose this were not the case, but as is shown in Figure 2, that the restoring force were rather contributed by mechanical springs of fixed spring rate. Suppose then that the gain factor of amplifier 65 were adjusted to produce stable balancing action of motor 64 at a low air speed. If then the air speed increased, the moment unbalance due to $P_l-P_u$ caused by a given small change in angle of attack would produce greater deflection of lever 21, resulting in a higher speed of motor 64 than allowable for stability. Overshooting and oscillation would occur, which would be detrimental to the accuracy of indication. On the other hand, if the gain were adjusted for stable operation at maximum air speed, it would be far below that required for most rapid stable response at low air speed, and the balancing operation would be very sluggish. Two remedies for this undesirable situation would then be possible: either to decrease the amplifier gain as disclosed in Figure 2 or to increase the restoring spring rate with increasing air speed as disclosed in Figure 1. Decrease of amplifier gain is possible, but I consider it more practicable to increase the spring rate. To this end the restoring force is, in my invention, provided by the pressure responsive device 80, which exerts a force proportional to the pressure difference $P_l-P_s$. This varies with air speed exactly in the way required to maintain the stability of balancing constant.

Figure 3 shows an application of certain aspects of my invention applied to an altitude control which is adapted to provide a signal indicative of deviation of altitude from a selected altitude. This signal may be employed to automatically position the control surfaces of an airplane to bring the airplane back to the desired altitude. It is desirable that the value of this signal be proportional to deviation in feet of altitude from the preselected altitude. Since the change of atmospheric pressure for a given altitude change is greater at low altitude than at high altitude, and the device may be called upon to maintain various altitudes, atmospheric pressure cannot be used directly to give the desired signal. The described device automatically increases the sensitivity of an atmospheric pressure responsive device with increase in altitude so that the signal will be proportional to deviation in feet of altitude from the desired altitude.

This control device responds to the difference in pressures applied to the interior and exterior of a flexible bellows. The bellows acts on a pivoted lever which positions suitable control means on movement of the lever from a neutral position, and a first spring is employed to oppose contraction of the bellows. A second spring is disposed in the apparatus to impose a negative spring rate on the lever through its range of pivotal movement to cancel out the spring rate of the first spring and the bellows so that when the force of the bellows and first spring are in balance there will be no force tending to restore the lever to its neutral position. A similar device making use of negative spring rate is shown in Taylor Patent No. 2,545,056 to which reference is made for a more complete description of this principle. A second pressure responsive device is connected to the lever in a manner to provide a restoring force proportional to atmospheric pressure. The device produces a signal proportional to displacement in feet from a desired altitude.

Referring to the drawing in Figure 3, the components are supported by a casing 200. A lever 201 is provided with a fixed pivot point 202. One end of the lever 201 is pivotally attached to the free end of a bellows 203 at a point 204. The bellows 203 is attached to the casing 200 by a stud 205 and is of the aneroid type. The pressure within bellows 203 is less than that expected in the atmosphere under operating conditions and therefore tends to rotate the lever 201 in a clockwise direction. Movement of lever 201 by the bellows 203 is opposed by a spring 206 the right hand end of which is secured by a nut 207 which is threaded on a screw 208. Screw 208 turns freely in casing 200 with suitable bearing surfaces 209 which are provided in casing 200. Suitable means, not shown, prevent rotation of nut 207 on rotation of the screw 208. The spring 206 engages the free end of bellows 203 at point 210 and tends to rotate lever 201 counter clockwise about its pivotal axis. The force supplied by the spring 206 to the lever 201 may be adjusted by rotating the screw 208. It is desirable to be able to make this adjustment of spring 206 to be able to balance the force on the lever arm 201 by bellows 203 for any pressure condition the bellows may be subjected to. A reversible motor 211 is used to rotate screw 208 through gear train 212. The details of motor 211 are omitted in the drawing but it is to be understood that motor can be any type of a reversible motor, preferably a two-phase electric motor, one phase of which is energized directly from a source of A.C., the other phase being energized through an amplifier which is controlled by a displacement-sensitive pick-up device, one type of which will be described. The details of amplifier 235 are also omitted but it is to be understood that any type of amplifying device capable of energizing the controlled phase winding of the motor for rotation in either direction may be used. This motor 211 can be controlled in any desirable manner. One such manner is shown in Figure 3. Potentiometer 224 is connected across the same A.C. voltage supply source as motor 211. The potentiometer has a center tap which is connected to one terminal of a double pole double throw switch 230. The other terminal of switch 230 is connected to potentiometer wiper 223. The upper side of switch 230 connects to a control means. The lower side of switch 230 connects to an amplifier 235 which drives two phase A.C. motor 211. With the switch 230 in the down position motor 211 is controlled by the described means to be responsive to displacement of the lever arm 201. The polarity of the connections is so chosen that the motor runs in a direction to reduce the displacement of lever arm 201. Such arrangement allows the motor 211 to keep the lever arm 201 in a neutral position with the bellows 203 and spring 206 in balance until the desired altitude is reached at which time the operation of motor 211 can be discontinued by putting switch 230 in the up position and any displacement of lever arm 201 used to generate the desired electrical signal for the control means operation.

A compensating spring 215 has its upper end connected to an extension 216 of lever arm 201 and its lower end attached to a nut 217 that is threaded on a screw 218. The screw 218 extends through an opening 220 in casing 200 and is pivoted by means of washer 221 having knife edge projections for engaging suitable recesses in casing 200. Screw 218 may be adjusted to vary the tension on the spring 215. The spring 215 is pivoted through the screw 218 and knife-edged washer 221 on an axis such that the spring 215 will be in a plane normal to the axis of the bellows 203 and the spring 206 when the lever 201 is also normal thereto. It will be seen when spring 215 is in this position it will have no effect on the position of lever 201 since the force of the spring 215 is in line with the pivot 202. However, as the lever 201 is pivoted in either direction from this position the effect of spring 215 will be to move the lever 201 to a position still further from the position it would assume if influenced only by bellows 203 and spring 206. By suitably adjusting the tension of spring 215 the lever 201 will move through a given angle upon a change in pressure upon the bellows 203 that is much smaller than the change in pressure that would be required to move the lever the same amount without the effect of the spring 215 superimposed on the effect of the resilience of the spring 206, and the resilience of the bellows 203. The spring 215 is preferably adjusted to cancel out the resilience of spring 206 and bellows 203. Then in the condition when the pressure on the bellows 203 balances the force of the spring 206, the lever arm 201 could assume any position within a limited range, with no other force in the system to influence lever 201. Lever arm 201 has an extension 222 which has a potentiometer wiper 223 fastened to one end. Wiper 223 will move along potentiometer 224 as lever arm 201 moves, and displacement of wiper 223 on potentiometer 224 can provide a signal that can be used to actuate an airplane autopilot for altitude control purposes, as previously described.

A diaphragm 225 also carried by the frame 200 is used to compensate for the difference in feet variation for a given pressure change at various altitudes. The pressure within diaphragm chamber 229 is less than that expected in the atmosphere under operating conditions and therefore it tends to pull lever 201 to its neutral position through a link 226. The link 226 is in tension and has one end attached to the diaphragm 225 at a pivot point 227. Therefore, under the condition where spring 215 cancels the resilience of spring 206 and bellows 203, the force on lever arm 201 applied through link 226 by a pressure on diaphragm 225 is the sole restoring force and will be proportional to the atmospheric pressure. Therefore, since rate of change in pressure with altitude is less at the higher altitude, and since the pressure is also less at higher altitudes, the deflection produced by a given change in altitude is maintained directly proportional to the change in altitude. This is obviously a desirable result for both indication and control.

When a reference altitude is selected and the recentering motor 211 is disconnected from the system, any change in altitude will produce a change in pressure causing expansion or contraction of bellows 203, which will apply a force to lever arm 201 proportional to the change in pressure. There will be an additional component of force applied to lever arm 201 due to the pressure on diaphragm 225. As this force on diaphragm 225 will be directly proportional to pressure, the movement of lever arm 201 due to the force of bellows 203 will be compensated a varying amount proportional to the existing altitude. Therefore, the position of lever arm 201 will indicate change of altitude in feet regardless of the altitude at which the control device is used, and the signal produced by the potentiometer will be proportional to deviation in feet from the selected altitude. I therefore employ a second pressure responsive means to vary the sensitivity of a first pressure responsive means to compensate for a change in conditions affecting the first pressure responsive means. A broad view of the invention involves use of a condition responsive element to vary the sensitivity of a control device that is primarily actuated by another condition responsive element. With this view in mind it will be evident that this phase of the invention is applicable to a wide variety of control devices regardless of the conditions to be sensed and the type of signal producing means employed.

The various described embodiments of the invention are illustrated only and are not to be regarded as limiting the scope of the invention which is defined in the following claims.

I claim as my invention:

1. A device for indicating attitude of an aircraft with respect to the surrounding air stream including indicating means, a member pivotally mounted on a pivot and having a neutral position, a sensing head attached to said aircraft having impact orifices for sensing pressures at two spaced points on said aircraft, means responsive to the difference of said pressures connected to said member for exerting a turning moment on said member to rotate said member from said neutral position about said pivot, linkage means attached to said member, means responsive to air speed of the aircraft and pivotally connected to said linkage means remote from said pivot of said member for exerting an opposing moment on said member, means including a sensing means controlled by a departure of said member from said neutral position for rotating said air speed responsive means about a fixed point remote from said pivot to vary the amount of said opposing moment by varying its effective moment arm until said turning and opposing moments are in balance, with said member in said neutral position, and means connecting said last named means to said indicating means to position the latter in accordance with the rotation of said air speed responsive means.

2. A device for indicating attitude of an aircraft with respect to the surrounding air stream including indicating means, a member pivotally mounted on a pivot, a sensing head attached to said aircraft for sensing pressures at two spaced points on said aircraft, means responsive to the difference of said pressures connected to said member for exerting a turning moment on said member about said pivot to rotate said member from a neutral position, linkage means attached to said member, means responsive to the air speed of the aircraft and pivotally connected to said linkage means remote from said pivot of said member for exerting an opposing moment on said member, means including a sensing element controlled by a departure of said member from said neutral position for rotating said air speed responsive means about a fixed point remote from said pivot to vary the amount of said opposing moment by varying its effective moment arm until said turning and opposing moments are in balance with said member in said neutral position, means connecting said last named means to said indicating means to position the latter in accordance with the rotation of said air speed responsive means, and second means responsive to air speed and attached to one extremity of said pivoted member remote from its pivot and adapted to apply a force thereto in proportion to displacement of said member from said neutral position and to air speed, to bias said member to said neutral position.

3. A device for indicating attitude of an aircraft with respect to the surrounding air including indicating means, a pivotally mounted member having a neutral position, means responsive to the change in differential air pressure at two spaced points as the attitude of the aircraft changes for exerting a turning moment on said member about its pivot toward and away from said neutral position, means responsive to air speed of the aircraft for exerting an opposing moment on said member about its pivot, balancing means connected to said pivotally mounted member and operated upon departure of said member from said neutral position for varying the amount of said opposing moment until said turning and opposing moments substantially balance each other with said member in said neutral position, means connecting said balancing means to said indicating means to position the latter in proportion to the operation of said balancing means required to balance said member in said neutral position, and second means responsive to air speed attached at one extremity to said pivotally mounted member remote from its pivot and adapted to apply a force thereto generally in the direction of extent of said member, said second means applying a force to said pivoted member in proportion to air speed and departure of said member from said neutral position to bias said member toward said neutral position.

4. A device for indicating attitude of an aircraft with respect to the surrounding air including indicating means, a pivotally mounted member having a neutral position, means responsive to the change in differential air pressure at two spaced points as the attitude of said aircraft changes for exerting a turning moment on said member about its pivot toward and away from said neutral position, means responsive to air speed for exerting an opposing moment on said member about its pivot, a sensing device attached to said pivotally mounted member and operated in response to departure of said member from said neutral position, balancing means operated by said sensing device for varying the amount of said opposing moment until said turning and opposing moments substantially balance each other with said member in said neutral position, said balancing means mounting said air speed responsive means for rotation through an angle to vary the amount of said opposing moment by varying its effective moment arm, means connecting said balancing means to said indicating means to position the latter in proportion to the rotation of said air speed responsive means required to balance said moments with said member in said neutral position, and second means responsive to air speed and attached at one extremity to said pivotally mounted member remote from its pivot, said second means being adapted to apply a force to said member in proportion to air speed and departure of said member from said neutral position to bias said member towards said neutral position.

5. A device for indicating attitude of an aircraft with respect to the surrounding air including indicating means, a pivotally mounted member having a neutral position, means responsive to the change in the difference in air pressures at two spaced points as the attitude of the aircraft changes for exerting a turning moment on said member about its pivot toward and away from said neutral position, means responsive to air speed of said aircraft for exerting an opposing moment on said member about its pivot, a sensing device attached to said pivotally mounted member and operated in response to the departure of said member from said neutral position, amplifier and motor means connected to and controlled by the operation of said sensing device, means pivotally mounted at a fixed point remote from said pivotally mounted member and mounting said air speed responsive means and being connected to and driven by said motor means, said motor means being adapted to rotate said pivotally mounted member with said air speed responsive means thereon about said fixed point to vary the amount of said opposing moment by varying its effective moment arm until said turning and opposing moments balance with said member in said neutral position, and means connected to said pivotally mounted member to be driven by said motor means and operating said indicating means to position the latter in proportion to the rotation of said pivotally mounted member required to balance said member in said neutral position.

6. In an angle of attack indicating device, a sensing head having orifices sensing impact and static pressures and a pair of angularly directed orifices disposed in a vertical plane sensing pressures indicative of angle of attack, a force balance system actuated by said pressures from said sensing head including a pivoted lever having a neutral position, means attached to said lever for providing a first moment of force proportional to the difference between impact and one of the angle of attack pressures and applying said force substantially normal to said lever in a given direction of rotation about said pivot, means attached to said lever for providing a second moment of force proportional to the difference between the impact and the other of said angle of attack pressures and applying said force substantially normal to said lever in a direction of rotation opposite to that of said first named moment of force about said pivot, means providing a third moment of force proportional to the difference between impact and static pressures, including means pivotally connecting said last named means to said lever, means including a device sensing departure of said lever from said neutral position for pivoting said means providing said third moment of force about a fixed point lying on a line normal to said lever at said pivot when said lever is in said neutral position and remote therefrom, means responsive to the rotation of said third force providing means to indicate angle of attack, and means for providing a fourth moment of force proportional to the difference between impact and static pressures attached to said lever and applied substantially along the extent of said lever to bias the same toward said neutral position.

7. A device for indicating attitude of an aircraft with respect to the surrounding air including indicating means, a pivotally mounted member having a neutral position, means responsive to the change of the difference in air pressures at two spaced points upon a change in the attitude of the aircraft for exerting a turning moment on said member about its pivot toward and away from neutral position, means responsive to air speed of said aircraft for exerting an opposing moment on said member about its pivot, a sensing device attached to said pivotally mounted member and operated in response to the departure of said member from said neutral position, amplifier and motor means connected to and controlled by the operation of said sensing device, means pivotally mounted at a fixed point remote from said pivotally mounted member and mounting said air speed responsive means and being connected to and driven by said motor means, said motor means being adapted to rotate said pivotally mounted means with said air speed responsive means thereon about said fixed point to vary the amount of said opposing moment by varying its effective moment arm until said turning and opposing moments balance with said member in said neutral position, biasing means attached to one extremity of said pivotally mounted member and adapted to bias said member to said neutral position, a second air speed responsive means, means connecting said last mentioned responsive means to said sensing device to modify the output of said sensing device and thereby modify the operation of said motor means, and means connected to said pivotally mounted means to be driven by said motor means and operating said indicating means to position the latter in proportion to the rotation of said pivotally mounted means required to balance said member in said neutral position.

8. Apparatus for measuring a condition determined by a pressure differential and a second variable condition comprising a pivoted lever member having a neutral position, means responsive to said pressure differential for exerting a turning moment on said pivoted lever member to urge it out of its neutral position, means responsive to said second variable condition for exerting an opposing moment on said pivoted lever member, balancing means connected in part to said pivoted lever member and operated upon departure of said lever member from its neutral position for varying the amount of said opposing moment until said turning and opposing moments substantially balance each other with said pivoted lever member in said neutral position, means connecting said balancing means to an indicating means responsive to the operation of said balancing means to operate said indicating means in proportion to the operation of said balancing means required to balance said lever member in said neutral position, and second means responsive to said second variable condition and attached to one extremity of said pivoted lever member remote from the pivot and adapted to apply force generally in the direction of the extent of said lever member, said second named means applying said force in proportion to said second variable condition and the departure of said lever member from said neutral position to bias said lever member toward said neutral position.

9. In an angle of attack indicating apparatus, a pressure sensing head sensing pressures indicative of air speed and pressures in angularly directed orifices disposed in a vertical plane indicative of angle of attack, a force balance system operated by said pressures and including a lever member pivoted about a fixed point, means connected to said lever member and responsive to the difference between angle of attack pressures for rotating said lever member from a neutral position, a device actuated by the pressures indicative of air speed for returning said lever member to said neutral position, means pivotally connecting said device to said lever member, means including a sensor responsive to the departure of said lever member from said neutral position upon unbalance of said lever for pivoting said device about a second fixed point removed from said first named fixed point to apply a force created by said device to said lever member through a variable moment arm to balance said lever system in said neutral position, said device being rotated through an angle which is proportional to the difference between angle of attack pressures, and a second device operated by the pressures indicative of air speed and attached to one extremity of said pivoted lever member to bias said lever member toward said neutral position.

10. Apparatus for measuring a condition determined by a pressure differential and a second variable condition comprising, a member mounted for movement about a pivot and having a neutral position, means responsive to the pressure differential and attached to said member for exerting a turning moment on said member to move said member from said neutral position about said pivot, linkage means attached to said member, means responsive to said second variable condition and pivotally connected to said linkage means remote from said pivot of said member for exerting on said member a moment which opposes the first named turning moment, sensing means, means including said sensing means controlled by a departure of said member from said neutral position for moving said second variable condition responsive means about a fixed point remote from said pivot to vary the amount of said opposing moment by varying its effective moment arm until said turning and opposing moments are in balance with said member in said neutral position, indicating means, and means connecting said last named means to said indicating means to position the latter in proportion to the rotation of said second variable condition responsive means.

11. A condition sensitive apparatus comprising a pivoted lever member having a neutral position, first means responsive to a pressure differential for exerting a turning moment on said pivoted lever member to urge it out of its neutral position, displacement responsive means responsive to the position of said lever, rebalancing means actuated by said displacement responsive means for exerting a moment on said pivoted lever opposing the moment of said first responsive means, and second means responsive to a variable condition and attached to one extremity of said pivoted lever remote from the pivot adapted when said lever is displaced from its neutral position to apply a component of force thereto tending to produce rotation which is a function both of displacement of said pivoted lever member from its neutral position and of the value of the condition affecting said second means.

12. A condition sensitive apparatus comprising in combination, first means responsive to a variable condition, a pivoted member having a neutral position, said first means actuating said pivoted member, second means responsive to a variable condition, attachment means for connecting said second means to a point on said pivoted member remote from its pivot point, said second means having no effect on said pivoted member when said pivoted member is in the neutral position, rebalancing means for opposing said first means actuation of said pivoted member, displacement responsive means responsive to the position of said pivoted member actuating said rebalancing means, said second means through said attaching means adapted to apply a component of force to said pivoted member when said pivoted member is displaced from its neutral position tending to produce rotation which is a function both of displacement of said pivoted member from its neutral position and of the value of the condition affecting said second means.

13. A condition responsive control device, comprising in combination, a first flexible element responsive to a variable condition, control means, a pivoted lever arm to actuate said control means, said pivoted lever arm having a neutral position, said first flexible element actuating said lever arm, rebalancing means for opposing said first flexible elements actuation of said lever arm, operation responsive means responsive to said lever arm operating said balancing means, a second flexible element responsive to a variable condition, a link connecting said second flexible element to a point on said pivoted lever arm remote from its pivot point, the pivot points of said link being in line with the pivot point of said lever arm when said lever arm is in neutral position, said second flexible element through said link adapted to apply a component of force thereto tending to produce rotation which is a function both of displacement of said pivoted lever arm from its neutral position and of the value of the condition affecting said second flexible element.

14. A pressure responsive control device including a lever arm mounted for movement about a pivot, said lever arm having a neutral position, control means actuated by said lever arm, first pressure responsive means attached to the lever arm for exerting a turning moment to said lever arm, a first spring connected to said lever arm to oppose said first pressure responsive means, means for varying the tension of said first spring, operation responsive means actuated by said lever arm operating said means, second spring means acting on said lever arm to reduce the spring rate of the system to substantially zero, second pressure responsive means, a link connecting said second pressure responsive means to a point on said lever arm remote from its pivot point, the pivot points of said link being in line with the pivot point of said lever arm when said lever arm is in neutral position, said second pressure responsive means, through said link being adapted to apply a component of force thereto tending to produce rotation which is a function both of displacement of said pivoted lever arm from its neutral position and of the value of the pressure affecting said second pressure responsive means.

References Cited in the file of this patent

UNITED STATES PATENTS

| 1,621,835 | Davis | Mar. 22, 1927 |
| 2,140,765 | Reutter | Dec. 20, 1938 |
| 2,237,306 | Hood | Apr. 8, 1941 |
| 2,365,923 | Wilkenson et al. | Dec. 26, 1944 |
| 2,396,617 | Von de Steinen | Mar. 12, 1946 |
| 2,537,932 | Kliever | Jan. 9, 1951 |
| 2,660,058 | Schuck | Nov. 24, 1953 |